United States Patent
Tsutsui et al.

[11] Patent Number: 6,059,679
[45] Date of Patent: May 9, 2000

[54] AUTO TENSIONER

[75] Inventors: Takashi Tsutsui, Osaka; Tadasu Yamakawa, Nara, both of Japan

[73] Assignee: Koyo Seiko Co., Ltd., Osaka, Japan

[21] Appl. No.: 09/196,122

[22] Filed: Nov. 20, 1998

[30] Foreign Application Priority Data

Nov. 27, 1997 [JP] Japan .................................. 9-325991

[51] Int. Cl.[7] ................................ F16H 7/12; F16H 7/14
[52] U.S. Cl. ........................... 474/135; 474/117; 474/133
[58] Field of Search .................................... 474/101, 109, 474/133, 135, 117, 115

[56] References Cited

U.S. PATENT DOCUMENTS

| | | | |
|---|---|---|---|
| 5,647,813 | 7/1997 | Serkh ....................................... | 474/135 |
| 5,702,314 | 12/1997 | Schmid .................................... | 474/135 |
| 5,964,674 | 10/1999 | Serkh et al. ............................. | 474/135 |
| 5,993,340 | 11/1999 | Rocca et al. ............................. | 474/133 |
| 5,993,343 | 11/1999 | Rocca et al. ............................. | 474/135 |

FOREIGN PATENT DOCUMENTS

P7-253035  10/1990  Japan .

*Primary Examiner*—David A. Bucci
*Assistant Examiner*—Matthew A. Kaness
*Attorney, Agent, or Firm*—Jacobson, Price, Holman & Stern, PLLC

[57] ABSTRACT

An auto tensioner comprising a support shaft whose one end is fixed to a target attaching object and which has an arm support portion, an arm whose one end is rotatably supported by the arm support portion of the arm and which has a pulley support portion projecting fowardly and axially beyond the top end of the support shaft, a tension pulley which is rotatably supported by the pulley support portion of the arm and arranged at a position offset from the support shaft and a friction plate arranged between one end of the arm and the arm support portion of the support shaft and adapted to apply a rotary resistance to the arm. Further, the friction plate is provided with a load bearing member in its zone where a load resulting from the offset arrangement of the tension pulley is applied whereby the zone of the friction plate can have a sufficient degree of load-resistant property.

10 Claims, 10 Drawing Sheets

AUTO TENSIONER

BACKGROUND OF THE INVENTION

1. Field of the Invention

This invention relates to an auto tensioner for automatically keeping the tensile force of the belt of a belt drive mechanism at a suitable level and more particularly to an auto tensioner of the type in which a tension pulley around which the belt is passed is arranged at an offset position with respect to a support shaft for supporting a tension pulley supporting arm.

2. Description of the Prior Art

For example, the auto tensioner disclosed in the Unexamined published Japanese Patent Application No. H2-253035 is provided with a tension pulley around which a belt is passed, an arm for supporting the tension pulley, a support shaft for rotatably supporting the arm, a friction plate for applying a rotational resistance to the arm and a coil spring for pressing the arm against the friction plate and urging the arm in a direction of rotation thereof. This auto tensioner regulates the movement of the tension pulley in such a manner that the vibration or impact coming from the belt is attenuated while permitting the movement of the tension pulley, around which the belt is passed, in accordance with the fluctuation of the tensile force of the belt.

The above-mentioned friction plate is sandwiched between the front end face of the boss of the arm and a guide plate integrally attached to the front end of the support shaft so as to attenuate the vibration or impact from the belt. Further, the friction plate is held in pressure-contact with the boss of the arm and the guide plate due to the extension restoring force of the torsion coil spring. Such friction plate is usually formed of a clutch facing material, a brake lining or brake padding material.

In the above-described auto tensioner, the tension pulley is arranged at an offset position with respect to the support shaft so that the load applied on the tension pulley through the belt acts as a moment for tilting the arm. Consequently, the load (unbalanced load) applied on the required angle zone on the circumference of the friction plate excessively increases. Therefore, the abrasion of that zone tends to become extremely quick as compared to that of the remaining zone and as a result, the unbalanced abrasion of the friction plate takes place earlier thereby shortening the service life of the friction plate.

SUMMARY OF THE INVENTION

Accordingly, a main object of this invention is to provide an auto tensioner of the type in which the load resulting from the offset arrangement of the tension pulley of the tensioner is hardly applied on the friction plate.

Another object of the invention is to provide an auto tensioner which is capable of preventing the early stage unbalanced abrasion of the friction plate thereby extending the life of the friction plate.

Other objects, features and advantages of the invention will become clear from the following description.

The auto tensioner of this invention comprises a support shaft whose one end is fixed to a target attaching object and which has an arm support portion, an arm whose one end is rotatably supported by the arm support portion of the support shaft and which has a pulley support portion projecting forwardly and axially beyond the top end of the support shaft, a tension pulley which is rotatably supported by the pulley support portion of the arm and which is arranged at a position offset from the support shaft and a friction plate which is arranged between one end of the arm and the arm support portion and which is adapted to apply a rotational resistance to the arm. Further, the auto tensioner is provided with a load bearing member in a zone of the friction plate on which a load resulting from the offset arrangement of the tension pulley is applied.

In view of the fact that the auto tensioner has such a structure that an unbalanced load acts on the friction plate because of the offset arrangement of the tension pulley, the load bearing member having a high degree of load bearing capacity is arranged in the load applied zone of the friction plate for bearing the load is provided in the load receiving zone of the friction plate whereby the load resulting from the offset arrangement of the tension pulley is hardly applied on the friction plate. Thus, the load withstanding property of the friction plate is increased. As a result, the early abrasion of the friction plate is inhibited.

It is preferable that the load bearing member be harder than the friction plate and have a coefficient of friction lower than that of the latter whereby if the hardness and the coefficient of friction of the friction plate are controlled, it will be possible to freely set up the total coefficient of friction including the coefficient of friction of the friction plate.

BRIEF DESCRIPTION OF THE DRAWINGS

These and other objects as well as advantages of this invention will become clear by the following description of preferred embodiments of the invention with reference to the accompanying drawings wherein.

In all these figures, like components are indicated by the same reference numerals.

DETAILED DESCRIPTION OF THE PREFERRED EMBODIMENTS

A preferred embodiment of an auto tensioner according to this invention will be described with reference to FIGS. 1 through 5. The auto tensioner 50 comprises a support shaft 1, an arm 2, a tension pulley 3, a torsion coil spring 4 and a friction plate 5. The support shaft 1 supports the arm 2 which rotatably supports the tension pulley 3. A belt 60 is passed around the tension pulley 3. The friction plate 5 applies a rotational resistance to the arm 2. The torsion coil spring 4 presses the arm 2 against the friction plate 5 and urges the arm 2 to one rotational direction.

Figure 1:
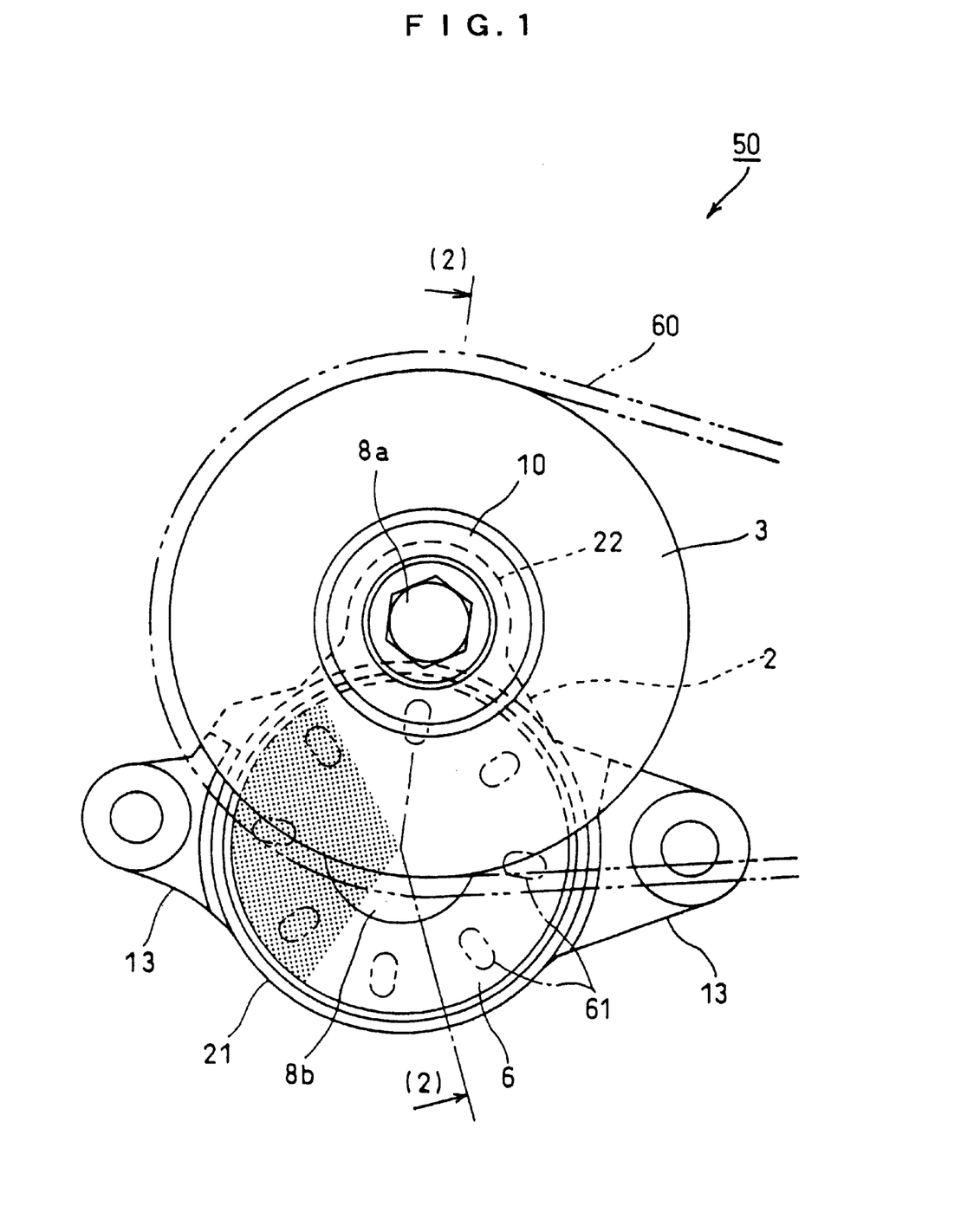
FIG. 1 is a front view of an auto tensioner according to a preferred embodiment of this invention.
Figure 2:
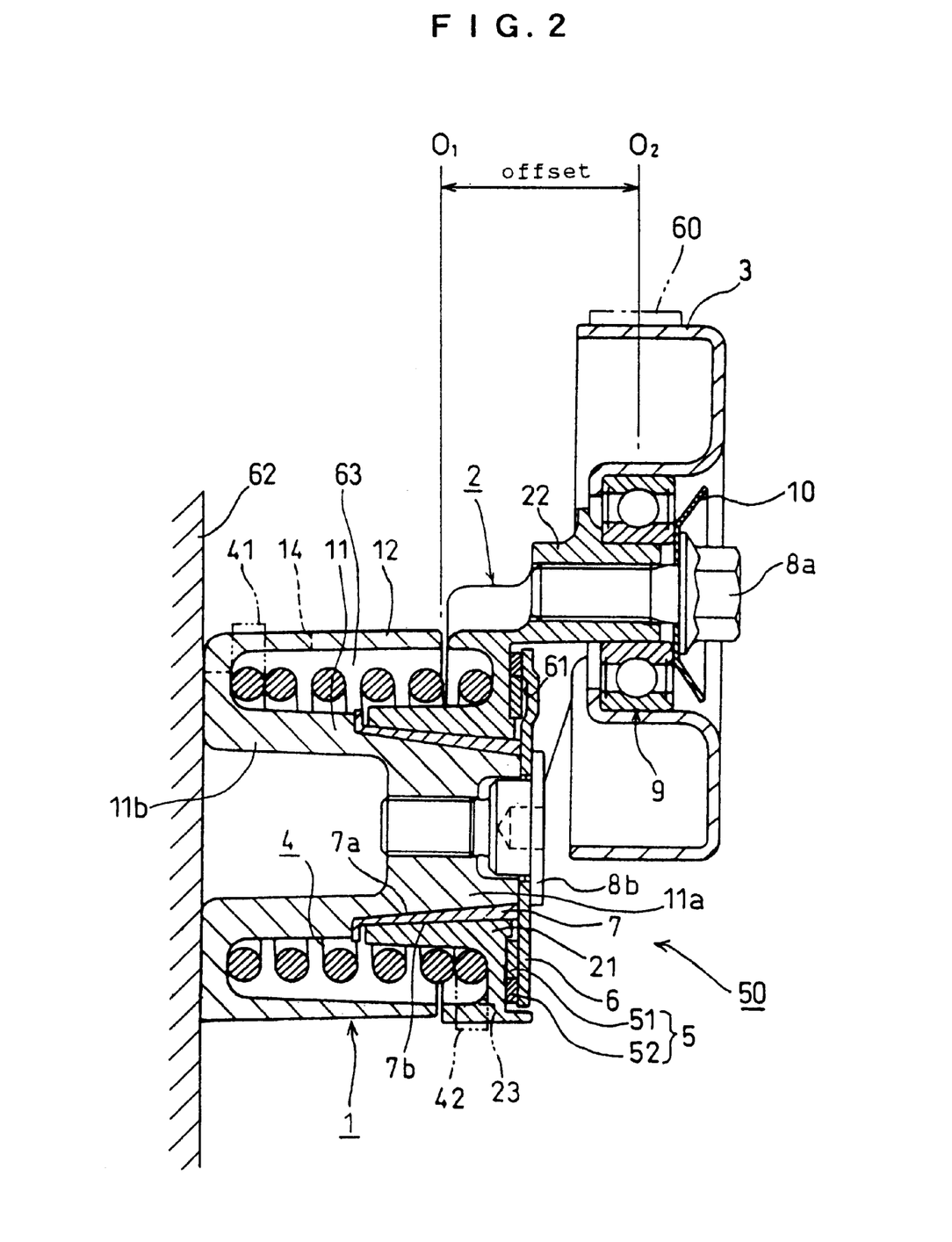
FIG. 2 is a sectional view taken along (2)—(2) line of FIG. 1.

One end of the support shaft 1 is fixed to a target attaching object 62 on which a belt drive mechanism (not shown) is provided. The support shaft 1 is provided with an arm support portion 11, a cover 12 and bolt-fitting pieces 13. The arm support portion 11 has a truncated top end half 11a and a cylindrical base end half 11b. The cover 12 extends radially and outwardly from the base end of the arm support portion 11 so as to surround the outer periphery of the arm support portion 11. The bolt-fitting pieces 13 are so formed as to project from the outer periphery of the cover 12. The support shaft 1 is made of a cast material formed by die casting using an aluminum alloy. The shape of the outer peripheral surface of the arm support portion 11 of the support shaft 1 corresponds to the draft of a metallic mold.

One end of the arm 2 is rotatably supported by the arm support portion 11 of the support shaft 1 while the other end thereof is made to project forward in the axial direction beyond the top end of the support shaft 1. Further, the arm 2 has a boss 21 at one end thereof and a pulley support portion 22 at the other end thereof. The boss 21 is rotatably fitted about the outer periphery of the arm support portion 11 of the support shaft 1 through a slide bearing 7. The pulley support portion 22 made to project in a direction reverse to the projecting direction of the boss 21. Like the support shaft 1, the arm 2 is made of a cast material manufactured by die casting using an aluminum alloy. The slide bearing 7 comprises a truncated cylindrical bush having a thickness becoming gradually larger from the larger-diameter portion toward the smaller-diameter portion thereof and made of a synthetic resin material, for example.

The tension pulley 3 is rotatably supported by the pulley support portion 22 of the arm 2 through a roller bearing 9 so that it is so arranged at a position offset from the support shaft 1 so as to project forward in the axial direction beyond the top end of the support shaft 1. In other words, the axial center $O_2$ of the rotary support portion of the tension pulley 3 for the arm 2 is offset from the axial center $O_1$ of the rotary support portion of the arm 1 for the support shaft 1. The tension pulley 3 is made of a press material. The tension pulley 3 is attached to the pulley support portion 22 of the arm 2 by means of a bolt 8a mounted on the pulley support portion 22. The roller bearing 9 is press-fitted between the inner peripheral surface of the tension pulley 3 and the outer peripheral surface of the pulley support portion 22 of the arm 2. A bearing protection cover 10 is attached to the top end of the pulley support portion 22 so as to prevent the entry of water or foreign matters into the roller bearing 9.

An annular space 63 is formed between the outer peripheral surfaces of the arm support portion 11 of the support shaft 1 and the boss 21 of the arm 2, and the inner peripheral surface of the cover 12 of the support shaft 1. The torsion coil spring 4 is disposed within the annular space 63 in a non-contact and torsionally-compressed state. The torsion coil spring 4 urges the arm 2 in a rotational direction (the counter-clockwise direction in FIG. 1) due to a torsional restoring force. Further, the torsion coil spring 4 applies a frictional resistance to the boss 21 by pressing the boss 21 of the arm 2 against the friction plate 5 due to an extension restoring force in the axial direction thereof. Radially and outwardly bent portions 41 and 42 are integrally provided on both ends of the torsion coil spring 4, respectively. These bent portions 41 and 42 are held in engagement with a slit-like recess 14 provided at the bottom of the support shaft 1 and a slit-like recess 23 provided at the boss 21 of the arm 2, respectively.

Figure 3:
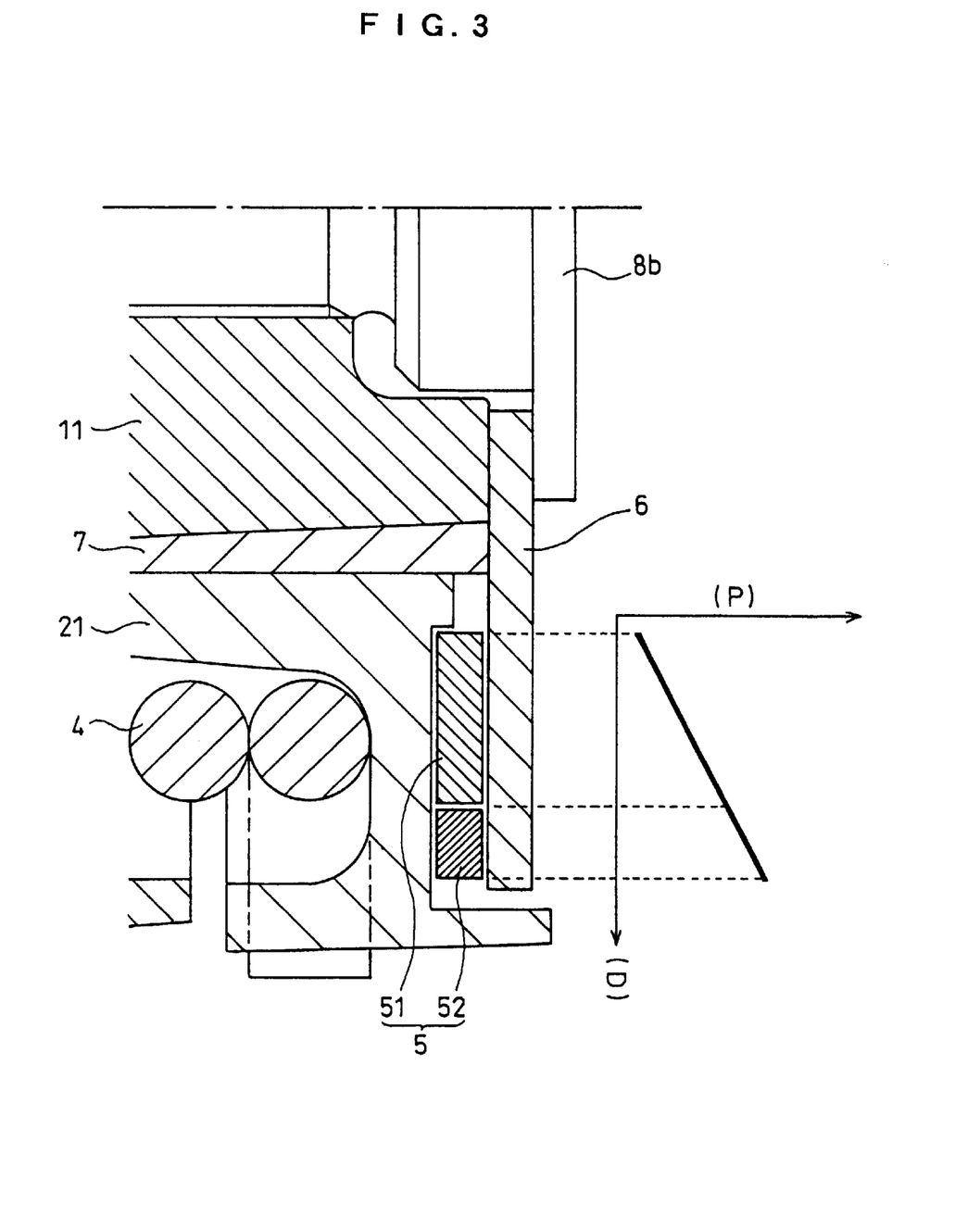
FIG. 3 is an enlarged sectional view of an essential portion of the auto tensioner according to FIG. 2.

The friction plate 5 is provided in a state in which it is sandwiched between the front end face of the boss 21 of the arm 2 and a friction plate pressure piece 6 that is fixed to the top end of the arm support portion 11 of the support shaft 1 by a bolt 86. Further, the friction plate 5 is pressed against the boss 21 and the friction plate pressure piece 6 under a required pressure due to the extension restoring force of the torsion coil spring 4 so as to apply a rotational resistance to the boss 21 of the arm 2. The friction plate pressure piece 6 is manufactured by pressing a structural rolled steel plate, for example. The friction plate pressure piece 6 is made integral with the arm support portion 11 of the arm 1 by being fixed in a locked state with respect to the arm support portion 11. Further, the friction plate pressure piece 6 is provided with a plurality of concave portions 61 (as abrasion powder storage portions) in the circumferential direction thereof. Each of the concave portions 61 stores the abrasion powder and discharge it outside.

The auto tensioner 50 described above permits the movement of the tension pulley 3 according to the variation of the tension and relaxation of the belt 60 while at the same time, it regulates the movement of the tension pulley 3 so as to attenuate the vibration and impact transmitted from the belt 60.

When the tensile force of the belt 60 decreases slowly, the arm 2 and the tension pulley 3 inclines to the left in FIG. 1 due to the restoring force of the torsion coil spring 4 so that the tensile force of the belt 60 is kept constant. When the tensile force of the belt 60 increases slowly, the arm 2 and the tension pulley 3 incline to the right in FIG. 1 against the restoring force of the torsion coil spring 4 so that the tensile force of the belt 60 is kept constant. The change in the above-described tensile force results from an environmental temperature change and a secular change in the expansion and contraction of the belt 60.

When a strong vibration or impact from the belt 60 is applied on the auto tensioner 50, the vibration or impact is transmitted to the boss 21 of the arm 2 supporting the tension pulley 3. However, the boss 21 of the arm 2 is pressed against the friction plate 5 due to the extension restoring force (the axial energizing force) of the torsion coil spring 4 thereby generating a frictional resistance. Consequently, the vibration or impact is absorbed and attenuated by the friction plate 5. As a result, any unnecessary vibration of the arm 2 is controlled so that the position of the tension pulley 3 does not substantially change and the tension of the belt 60 is kept constant.

In the case of the auto tensioner 50 according to the embodiment of this invention, the tension pulley 3 is arranged at an offset position so that the load of the belt 60 acting on the tension pulley 3 serves as a moment for tilting the arm 2 and so the load concentrates on the required angular zone along the circumference of the friction plate 5. The required angular zone is shown by a dot pattern in FIG. 1. It is confirmed that this required angular zone generally falls within an angular range of 90 through 180 degrees. Further, it is also confirmed that as shown by the graph in FIG. 3, the load (bearing stress) acting on the friction plate 5 becomes larger from the inside toward the outside thereof. Note that in the graph of FIG. 3, the axis of ordinate indicates a distance D and the axis of abscissa indicates the surface stress P on a frictional sliding surface.

Figure 4:
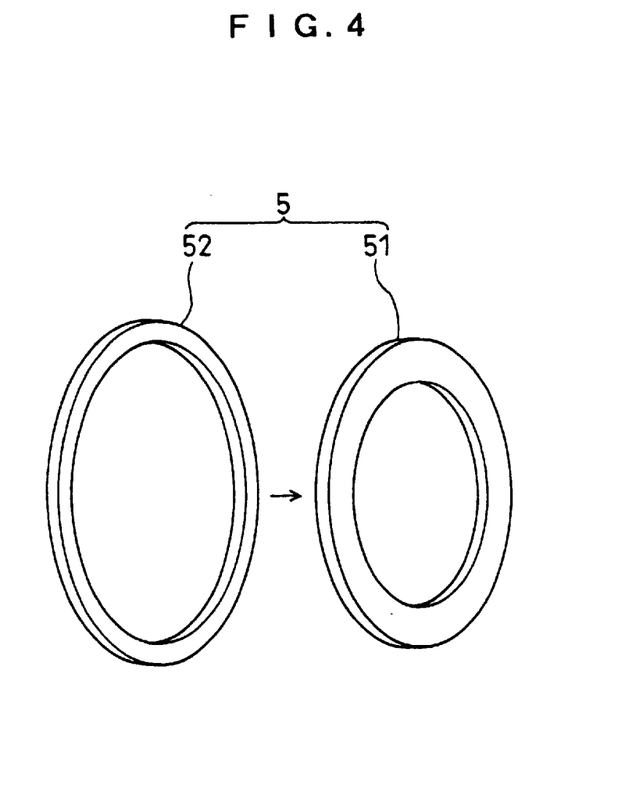
FIG. 4 is an exploded perspective view of a friction plate shown in FIG. 1.
Figure 5:
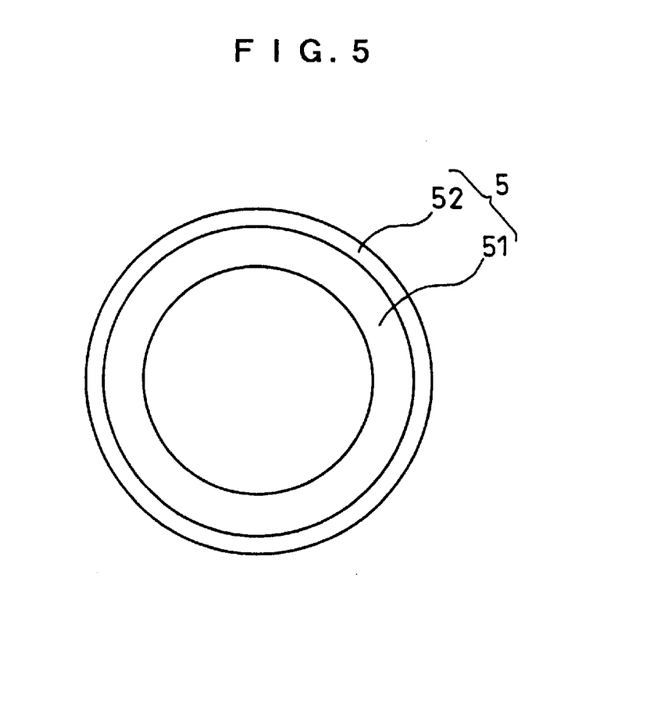
FIG. 5 is a plan view of the friction plate shown in FIG. 4 in its assembled state.

In view of the above-described facts, the friction plate 5 has the structure shown in FIGS. 3 through 5. The friction plate 5 comprises an inside annular body 51 and an outside annular body 52. Both of the annular bodies 51 and 52 are concentrically combined with each other. The outside annular body 52 is made to be a load bearing member. The inside annular body 51 is formed of a clutch facing material, a brake lining material or brake pad material and the outside annular body 52 is formed of an engineering plastic material which is harder than the material of which the inside annular body 51 is made and which has a coefficient of friction lower than that of the latter, for example, a thermoplastic synthetic resin (for example, PA: polyamide, PEEK: polyether ether ketone or PES: polyether sulfone) or a thermohardening synthetic resin mixed with glass fiber (phenol type). The hardness (Rockwell hardness HRR) of the inside annular body 51 is set to 10 through 80 or preferably 50 and the coefficient of friction is set to 3 through 0.6, preferably 0.5 while the hardness (Rockwell hardness HRR) of the outside annular body 52 is set to 100 through 130 or preferably 115 and the coefficient of friction ($\mu$) is set to 1 through 0.25 or preferably about 0.2. Further, the arrangement ratios W1/(W1+W2) and W2/(W1+W2) between both of the annular bodies 51 and 52 are properly set in consideration of their coefficients of friction, loads acting thereon, their required durabilities and vibration or impact damping characteristics. Note that W1 indicates the radial width of the inside annular body 51 and W2 indicates that of the outside annular body 52.

Thus, by constructing the friction plate 5 with the two annular bodies 51 and 52 and causing the annular body 52 to bear the load resulting from the offset arrangement of the tension pulley, the load-resistant property of the tensioner is improved and therefore, the above-mentioned load hardly acts on the inside annular body 51. As a result, the excessive abrasion of the annular bodies 51 and 52 in the load-concentrated zone can be controlled. Further, since a proper frictional resistance can be applied to the arm 2, the function of attenuating the vibration of, and the impact on, the arm can be performed in a stabilized manner.

In the above-described case, the two annular bodies 51 and 52 abrade simultaneously so that it becomes necessary to properly determine the properties of them. That is, despite that the outside annular body 52 is made hard and the coefficient of friction thereof is made low, it bears a comparatively high load while the inside annular body 51 which is made to have a high coefficient of friction bears a comparatively low load. Accordingly, by controlling the properties of both of the annular bodies 51 and 52, it becomes possible to allow them to abrade simultaneously and by so doing, it is possible to always make the contact conditions of the annular bodies 51 and 52, the boss 21 of the arm 2 and the friction plate pressure piece 6 substantially uniform irrespective of the progress of abrasion of the annular bodies 51 and 52. As a result, the frictional resistance to be applied on the arm 2 can be kept stabilized.

It should be noted that this invention is not always limited to the above-described embodiment but it includes the following various kinds of applications and modifications.

Figure 6:
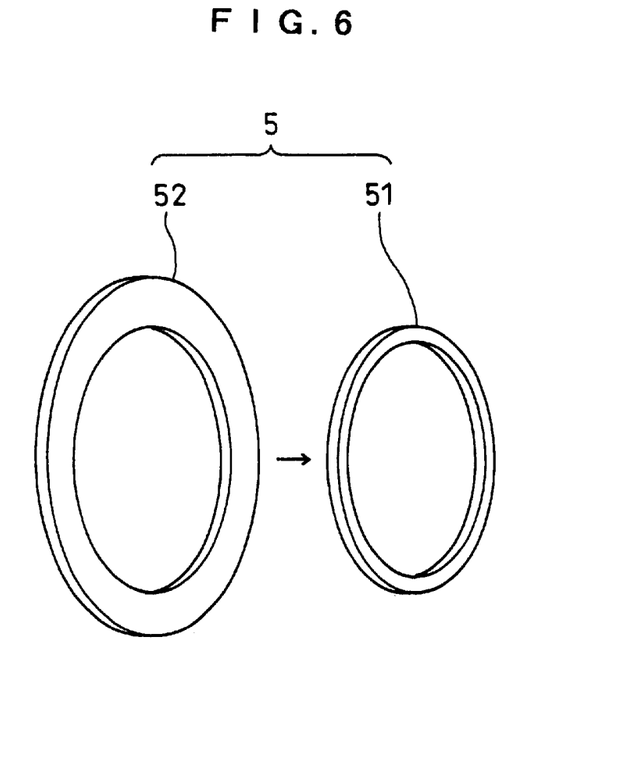
FIG. 6 is an exploded perspective view of an example of modification of the friction plate shown in FIG. 1.
Figure 7:
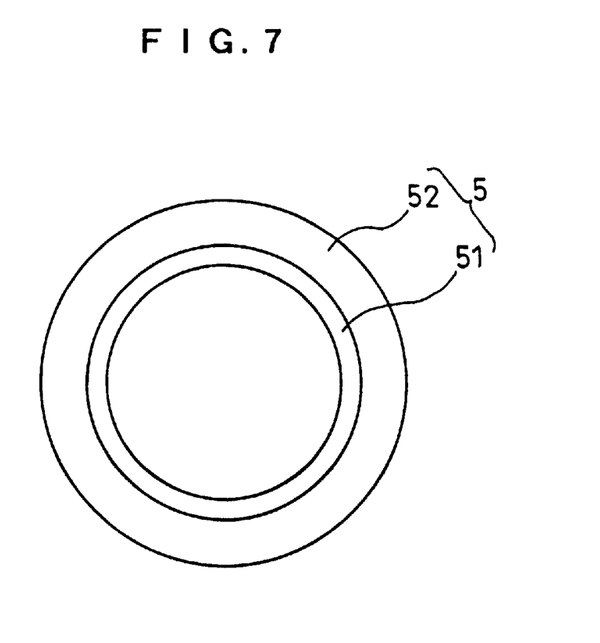
FIG. 7 is a plan view of the friction plate shown in FIG. 6 in its assembled state.

(1) In the above-described embodiment, an example is given in which the radial width W2 of the outside annular body 52 is shorter than the radial width W1 of the inside annular body 51 and the outside annular body 52 acts as a load bearing member but as shown in FIGS. 6 and 7, a structure in which the radial width W2 of the outside annular body 52 is larger than the radial width W1 of the inside annular body 51 and the inside annular body 51 acts as a load bearing member is also covered by this invention. Where the inside annular body 51 acts as the load bearing member, the same effect as that of the above-described embodiment is displayed.

Figure 8:
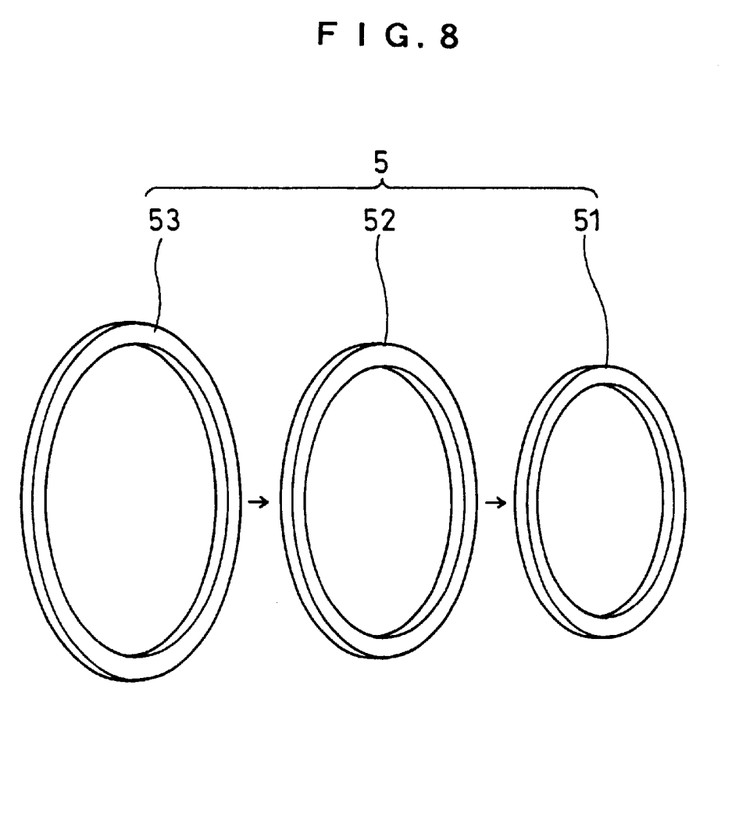
FIG. 8 is an exploded perspective view of another modification of the friction plate shown in FIG. 1.
Figure 9:
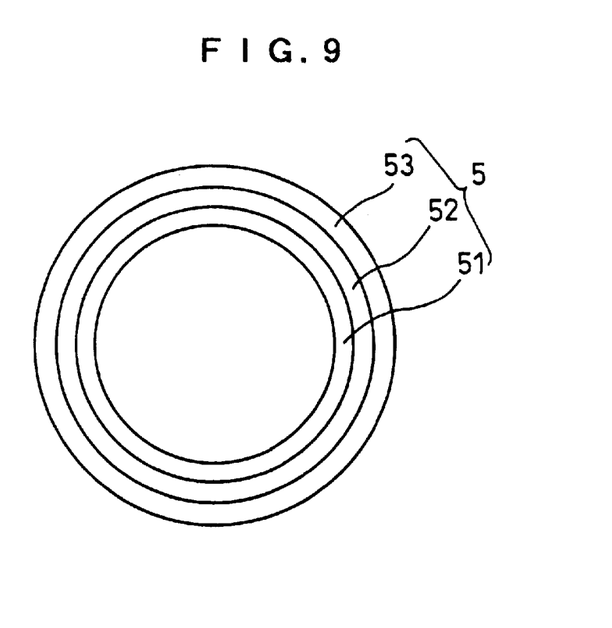
FIG. 9 is a plan view of the friction plate shown in FIG. 8 in its assembled state.

(2) In the above-described embodiment, an example is given in which the friction plate 5 is formed of two concentric annular bodies 51 and 52 but as shown in FIGS. 8 and 9, a structure in which the friction plate 5 is formed of three annular bodies 51, 52 and 53 or more than three annular bodies is also covered by this invention. In that case, any one of the annular bodies may be made to have the nature of the outside annular body 52 in the above-described embodiment and the coefficients of friction of the annular bodies may be properly changed.

Figure 10:
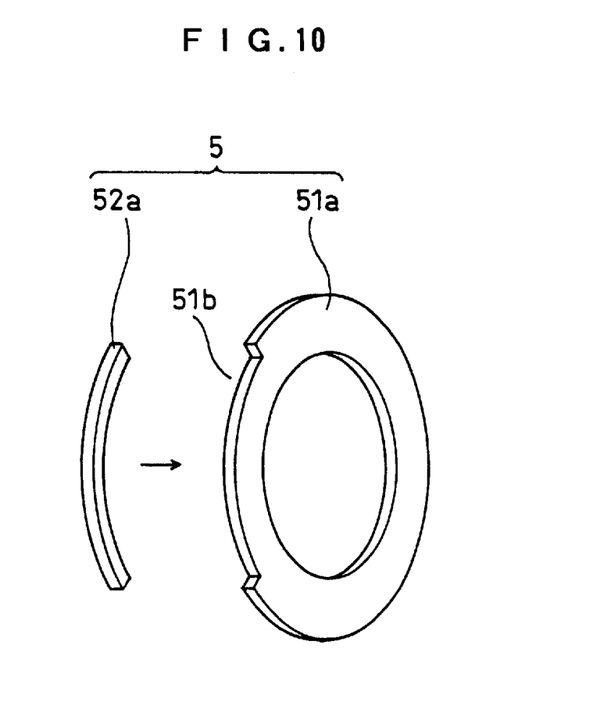
FIG. 10 is an exploded perspective view of still another modification of the friction plate shown in FIG. 1.
Figure 11:
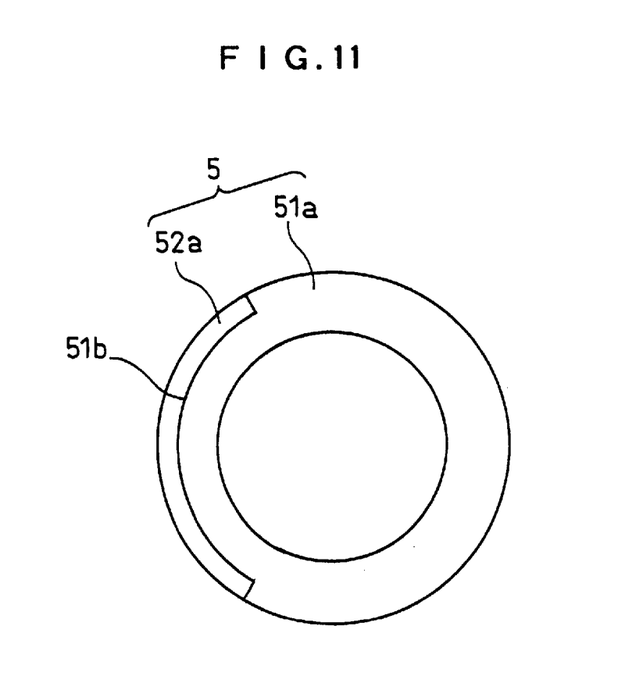
FIG. 11 is a plan 10 of the friction plate shown in FIG. 10 in its assembled state.
Figure 12:
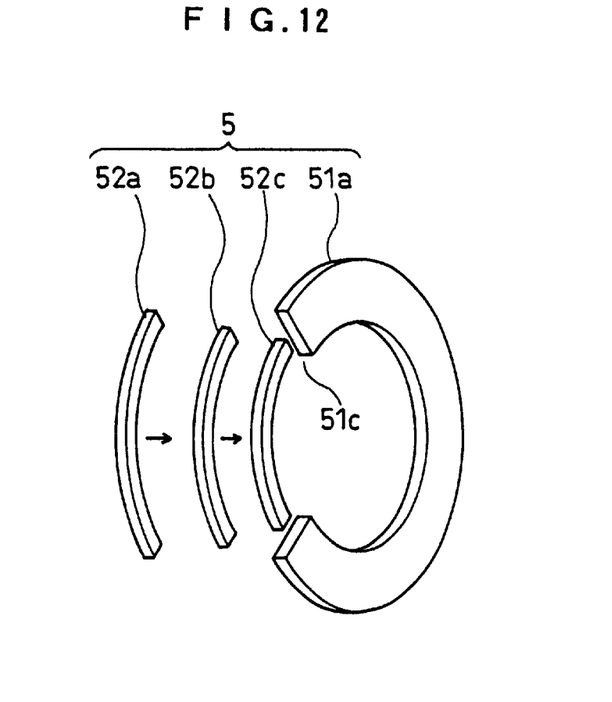
FIG. 12 is an exploded perspective view a further modification of the friction plate shown in FIG. 1.
Figure 13:
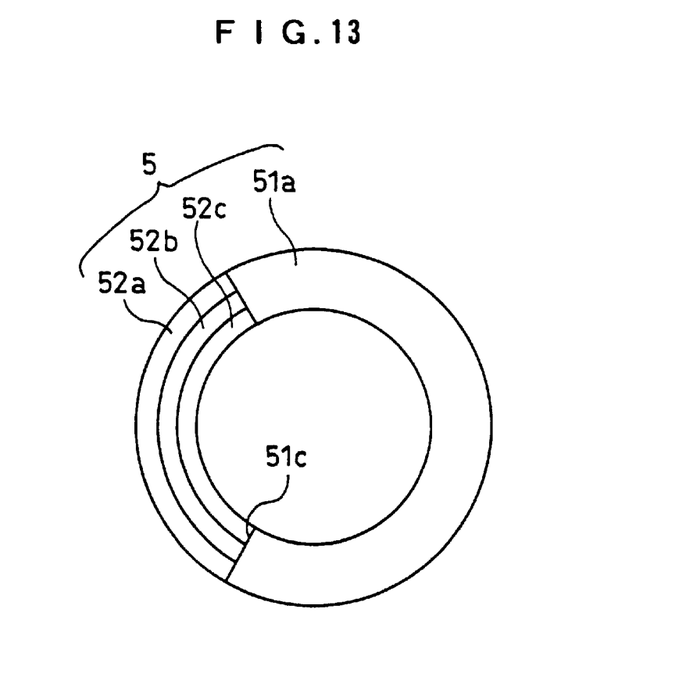
FIG. 13 is a plan view of the friction plate shown in FIG. 12 in its assembled state.
Figure 14:
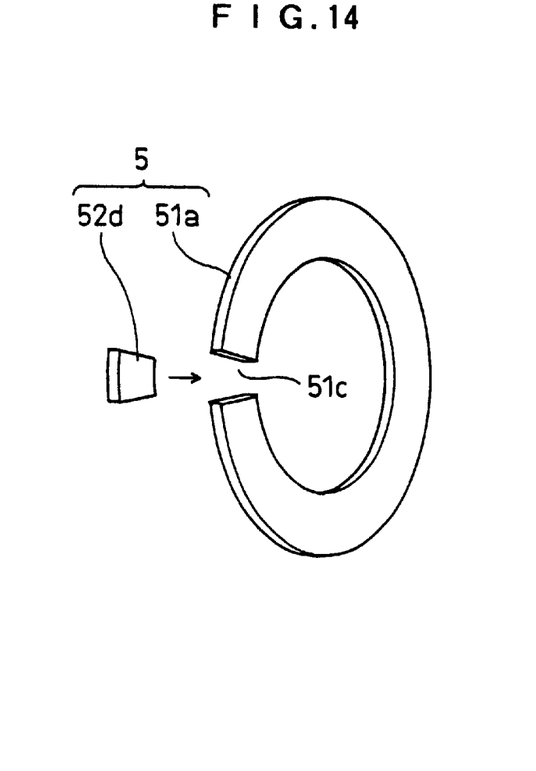
FIG. 14 is an exploded perspective view of a still further modification of the friction plate shown in FIG. 1.
Figure 15:
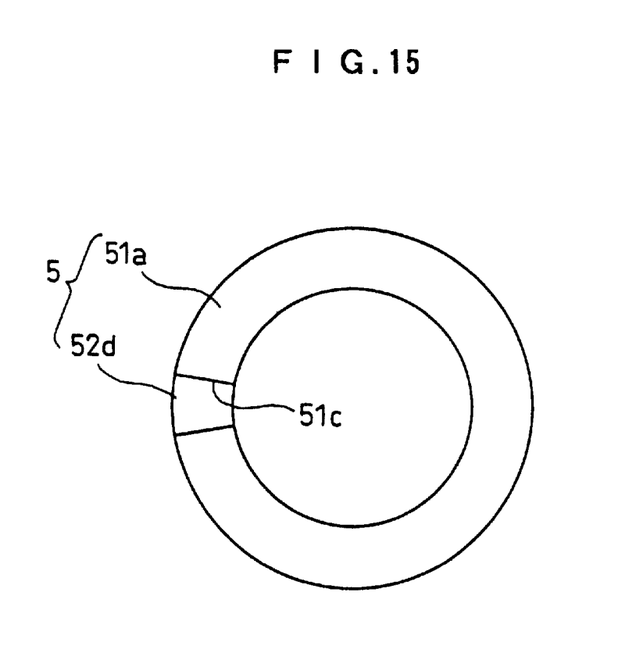
FIG. 15 is a plan view of the friction plate shown in FIG. 14 in its assembled state.
Figure 16:
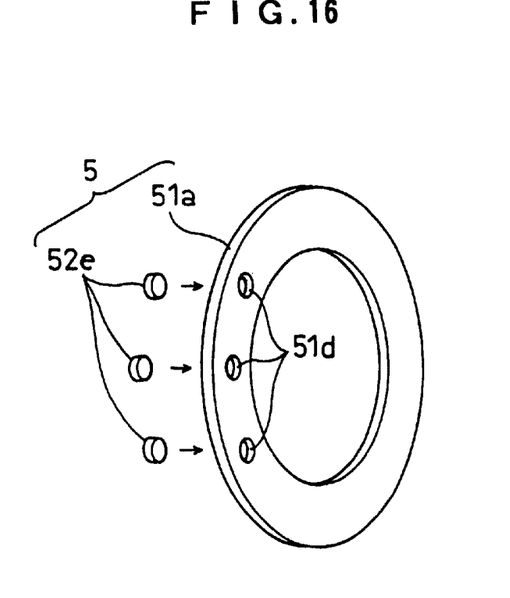
FIG. 16 is an exploded perspective view of a still further modification of the friction plate shown in FIG. 1.
Figure 17:
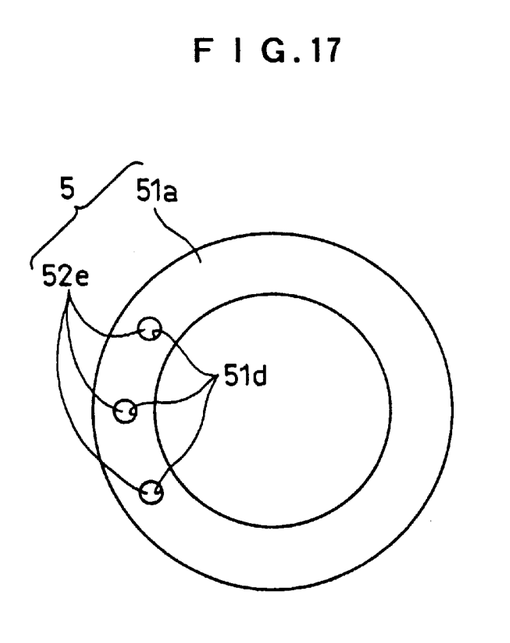
FIG. 17 is a plan view of the friction plate shown in FIG. 16 in its assembled state.

(3) In the above-described embodiment and in the above paragraphs (1) and (2), examples are given in which the friction plate 5 is formed of a plurality of annular bodies but as shown in FIGS., 10 through 17, for example, a portion of the required angular zone (a load applied zone) of the friction plate 5 on which a load resulting from the offset arrangement of the tension pulley tends to act is made to have the same nature as the outside annular body 52 in the above-described embodiment is also covered by this invention. That is, in the example shown in FIGS. 10 and 11, the friction plate 5 is so formed that it comprises a main body 51a having a segmental recess 51b on the outerside of the load applied zone with a load bearing member 52a of a shape and a size coinciding with the shape and size of the recess 51b arranged in the recess 51b. In the example shown in FIGS. 12 and 13, the friction plate 5 is so formed that it comprises a main body 51a having a segmental disconnected portion 51c formed by cutting a required angular range of a load receiving zone and three segmental load bearing members 52a, 52b and 52c arranged in the disconnected portion 51c. In the example shown in FIGS. 14 and 15, the friction plate 5 is so formed that it comprises a main body 51a having a segmental disconnected portion 51c formed by cutting a required angular range of a load receiving zone and a load bearing member 52d having a shape and a size coinciding with the shape and size of the disconnected portion 51c and disposed in the segmental disconnected portion 51c. Further, in the example shown in FIGS. 16 and 17, the friction plate 5 is so formed that it comprises a main body 51a having a plurality of through holes 51d passing through suitable portions, respectively, of the load receiving zone of the plate in the direction of thickness thereof and a plurality of load bearing members 52d each having a shape and a size coinciding with those of each of the through holes 51d. Like the above-described embodiment, it is possible with these cases to reduce the load acting on the friction plate main body 51 by causing the load bearing members 51a through 51e to bear the load thereby allowing a sufficient effect to be displayed for the prevention of unbalanced abrasion of the friction plate main body 51. It should be noted that in the case of the example shown in FIGS. 16 and 17, the through holes 51d and the load bearing members 52e may be formed at a plurality of uniformly spaced-apart points along the circumference of the friction plate main body 51 and in that case, there is no limitation to the orientation of the parts of the friction plate 5 at the time of assembling the parts thereby facilitating the assembly.

(4) In the above-described embodiment, an example is given in which the thickness of the slide bearing 7 is made variable in the axial direction but that thickness may be made uniform. Further, as regards the material for the slide bearing 7, various kinds of synthetic resin materials and metallic materials may be used only if each of them has the required sliding factor, load withstanding property and anti-abrasion property. Particularly, where a metallic material is used, a sintered metal impregnated with a lubricating oil may be used.

(5) In the above-described embodiment, a structure is given as an example in which the friction plate pressure piece 6 is provided with a plurality of concave portions 61 for storing and discharging the abrasion powder, a structure lacking such concave portions 61 is also covered by this invention.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An auto tensioner comprising:
   a support shaft having an arm support portion whose one end is fixed to a target attaching object;
   an arm whose one end is rotatably supported by the arm support portion of said support shaft and which has a pulley support portion projecting fowardly and axially beyond the top end of said support shaft;
   a tension pulley rotatably supported by the pulley support portion of said arm and arranged offset with respect to said support shaft and
   a friction plate arranged between one end of said arm and the arm support portion of said support shaft and adapted to apply a rotational resistance to said arm,
   wherein there is provided a load bearing member in a zone of the friction plate on which a load resulting from the offset arrangement of said tension pulley is applied.

2. The auto tensioner as claimed in claim 1, which is provided with a torsion coil spring disposed between one end of said arm and said support shaft and adapted to apply a rotary energizing force on said arm and to increase contact pressures among said friction plate, said one end of said arm and said support shaft.

3. An auto tensioner as claimed in claim 1, wherein said friction plate comprises first and second annular bodies of different diameters which are concentrically combined with each other and at least said first annular body is made harder than said second annular body so as to serve as said load bearing member.

4. An auto tensioner as claimed in claim 3, wherein said first annular body has a Rockwell hardness in the range of between 100 and 130 and said second annular body has a Rockwell hardness in the range of between 10 and 80.

5. An auto tensioner as claimed in claim 3, wherein the coefficient of friction of said first annular body is smaller than that of said second annular body.

6. An auto tensioiner as claimed in claim 5, wherein said first annular body has a coefficient of friction in the range of between 0.1 and 0.25 and said second annular body has a coefficient of friction in the range of between 0.3 and 0.6.

7. An auto tensioner as claimed in claim 1, wherein said friction plate comprises a plurality of annular bodies of different diameters which are concentrically combined with one another.

8. An auto tensioner as claimed in claim 1, wherein said friction plate has a main body provided with a through hole in said load applied zone thereof and said load bearing member is disposed within said through hole.

9. An auto tensioner as claimed in claim 1, wherein said friction plate has a main body provided with a recess formed in said load applied zone thereof and said load bearing member is arranged in said recess.

10. An auto tensioner as claimed in claim 1, said load bearing member is harder than said friction plate and has a coefficient of friction smaller than that of said friction plate.

* * * * *